US009234775B2

(12) United States Patent
Larson et al.

(10) Patent No.: US 9,234,775 B2
(45) Date of Patent: Jan. 12, 2016

(54) METHODS FOR VERIFYING GAS FLOW RATES FROM A GAS SUPPLY SYSTEM INTO A PLASMA PROCESSING CHAMBER

(71) Applicant: Lam Research Corporation, Fremont, CA (US)

(72) Inventors: Dean J. Larson, Pleasanton, CA (US); Robert C. Hefty, Mountain View, CA (US); James V. Tietz, Fremont, CA (US); William S. Kennedy, Fremont, CA (US); Eric H. Lenz, Pleasanton, CA (US); William M. Denty, Jr., San Jose, CA (US); Enrico Magni, Pleasanton, CA (US)

(73) Assignee: LAM RESEARCH CORPORATION, Fremont, CA (US)

( * ) Notice: Subject to any disclaimer, the term of this patent is extended or adjusted under 35 U.S.C. 154(b) by 252 days.

(21) Appl. No.: 14/045,412

(22) Filed: Oct. 3, 2013

(65) Prior Publication Data
US 2014/0033828 A1 Feb. 6, 2014

Related U.S. Application Data

(63) Continuation of application No. 11/178,323, filed on Jul. 12, 2005, now abandoned.

(51) Int. Cl.
*G01L 1/00* (2006.01)
*G01F 1/42* (2006.01)
(Continued)

(52) U.S. Cl.
CPC .. *G01F 1/42* (2013.01); *G01F 1/36* (2013.01); *G01F 25/0007* (2013.01); *G05D 7/0652* (2013.01)

(58) Field of Classification Search
CPC ............. G01F 25/00; G01F 1/42; G01L 7/00; G01L 1/00
USPC .................. 73/1.36, 861.61; 702/138, 140, 45
See application file for complete search history.

(56) References Cited

U.S. PATENT DOCUMENTS 5,220,515 A 6/1993 Freerks et al.
5,534,751 A 7/1996 Lenz et al.
(Continued)

OTHER PUBLICATIONS

Roth, A. "Viscous and Turbulent Flow", Vacuum Technology, Elsevier Science B. V., Amsterdam, The Netherlands, pp. 69 and 72, 1990.

*Primary Examiner* — Jewel V Thompson
(74) *Attorney, Agent, or Firm* — Buchanan, Ingersoll & Rooney PC (57) ABSTRACT

Methods of measuring gas flow rates in a gas supply system for supplying gas to a plasma processing chamber are provided. In a differential flow method, a flow controller is operated at different set flow rates, and upstream orifice pressures are measured for the set flow rates at ambient conditions. The measured orifice pressures are referenced to a secondary flow verification method that generates corresponding actual gas flow rates for the different set flow rates. The upstream orifice pressures can be used as a differential comparison for subsequent orifice pressure measurements taken at any temperature condition of the chamber. In an absolute flow method, some parameters of a selected gas and orifice are predetermined, and other parameters of the gas are measured while the gas is being flowed from a flow controller at a set flow rate through an orifice. In this method, any flow controller set point can be flowed at any time and at any chamber condition, such as during plasma processing operations. Gas supply systems are also disclosed.

25 Claims, 4 Drawing Sheets (51) Int. Cl.
   *G01F 1/36*   (2006.01)
   *G01F 25/00*  (2006.01)
   *G05D 7/06*   (2006.01)

(56) References Cited

U.S. PATENT DOCUMENTS

| | | | |
|---|---|---|---|
| 5,552,181 A | 9/1996 | Kondoh et al. | |
| 5,645,642 A | 7/1997 | Nishizato et al. | |
| 5,866,795 A | 2/1999 | Wang et al. | |
| 5,968,588 A | 10/1999 | Sivaramakrishnan et al. | |
| 5,975,126 A * | 11/1999 | Bump | G01F 1/6842 137/486 |
| 5,998,932 A | 12/1999 | Lenz | |
| 6,019,060 A | 2/2000 | Lenz | |
| 6,062,729 A * | 5/2000 | Ni | G01J 5/0003 374/121 |
| 6,119,710 A * | 9/2000 | Brown | G01F 1/50 137/14 |
| 6,178,919 B1 | 1/2001 | Li et al. | |
| 6,296,711 B1 * | 10/2001 | Loan | C23C 16/44 118/50 |
| 6,430,985 B1 * | 8/2002 | Drees | G01F 1/363 702/100 |
| 6,450,200 B1 * | 9/2002 | Ollivier | G05D 7/0647 137/486 |
| 6,508,913 B2 * | 1/2003 | McMillin | C23F 4/00 118/715 |
| 6,527,911 B1 | 3/2003 | Yen et al. | |
| 6,955,072 B2 | 10/2005 | Zarkar et al. | |
| 6,984,288 B2 | 1/2006 | Dhindsa et al. | |
| 7,153,709 B1 * | 12/2006 | Purdy | H01L 21/67288 438/12 |
| 7,169,231 B2 | 1/2007 | Larson et al. | |
| 7,174,263 B2 * | 2/2007 | Shajii | G01F 25/0053 702/100 |
| 7,216,019 B2 * | 5/2007 | Tinsley | G05D 7/0635 700/282 |
| 7,371,332 B2 | 5/2008 | Larson et al. | |
| 7,376,520 B2 | 5/2008 | Wong et al. | |
| 7,424,895 B2 | 9/2008 | Tison et al. | |
| 7,708,859 B2 | 5/2010 | Huang et al. | |
| 2004/0112540 A1 * | 6/2004 | Larson | G05D 7/0664 156/345.33 |
| 2004/0250600 A1 * | 12/2004 | Bevers | G01F 25/0038 73/1.16 |
| 2004/0261492 A1 * | 12/2004 | Zarkar | G01F 25/0038 73/1.34 |
| 2006/0011237 A1 * | 1/2006 | Tison | G01F 25/0038 137/487.5 |
| 2006/0212233 A1 * | 9/2006 | Wong | G01F 1/34 702/50 |

* cited by examiner

METHODS FOR VERIFYING GAS FLOW RATES FROM A GAS SUPPLY SYSTEM INTO A PLASMA PROCESSING CHAMBER

BACKGROUND

Semiconductor structures are processed in plasma processing apparatuses that include a plasma processing chamber, a gas source that supplies process gas into the chamber, and an energy source that produces plasma from the process gas. Semiconductor structures are processed in such apparatuses by techniques including dry etching processes, deposition processes, such as chemical vapor deposition (CVD), physical vapor deposition, or plasma-enhanced chemical vapor deposition (PECVD) of metal, dielectric and semiconductor materials and resist stripping processes. Different process gases and processing conditions are used for these processing techniques, as well as for processing different materials forming the semiconductor structures.

SUMMARY

An embodiment of the methods for verifying process gas flow rates from a gas supply system to a plasma processing chamber comprises a) setting a first flow controller to a first set point and flowing a gas at a first set flow rate from the first flow controller, the gas flowing through a first orifice of an orifice array into a plasma processing chamber which is at ambient temperature; b) setting the first flow controller to a second set point and flowing the gas at a second set flow rate from the first flow controller, the gas flowing through the first orifice or a second orifice of the orifice array into the plasma processing chamber which is at ambient temperature; c) for each of the first and second set flow rates, measuring the actual flow rate of the gas into the plasma processing chamber; d) determining a relationship between the first and second set flow rates and the actual flow rates for the first flow controller; e) measuring the pressure of the gas upstream of the first and second orifices at the first and second set flow rates, respectively, with the chamber at ambient temperature; f) determining a first empirical factor for the first flow controller for each of the first and second orifices using the actual flow rates and the measured upstream gas pressures for the first and second set flow rates; g) setting the first flow controller to a third set point and flowing the gas at a third set flow rate from the first flow controller, the gas flowing through the first or second orifice into the plasma processing chamber; h) measuring the pressure of the gas upstream of the first or second orifice at the third set flow rate; and i) determining the flow rate of the gas through the first or second orifice at the third set flow rate using the measured gas pressure and the first empirical factor for the respective first or second orifice.

Another embodiment of the methods for verifying process gas flow rates from a gas supply system to a plasma processing chamber comprises a) setting a first flow controller to a first set point and flowing a gas at a first flow rate from the first flow controller, the gas flowing at a viscous sonic flow rate through a first orifice of an orifice array into a plasma processing chamber; b) measuring a pressure ($P_1$) and temperature ($T_1$) of the gas upstream of the first orifice at the first flow rate; c) measuring a cross-sectional flow area (A) of the first orifice; d) determining for the gas, the specific heat at constant volume ($C_v$), the specific heat at constant pressure ($C_p$), the molecular weight (M) and an absolute empirical factor ($K_a$); and e) calculating the flow rate Q of the gas through the first orifice using the following equations (i)-(iii):

$$Q = AP_1 \left(\frac{P_2}{P_1}\right)^{1/\gamma} \left\{ \left(\frac{2\gamma}{\gamma-1}\right) \frac{R_0 T_1}{M} \left[1 - \left(\frac{P_2}{P_1}\right)^{(\gamma-1)/\gamma}\right] \right\}^{1/2} \cdot K_a \quad \text{(i)}$$

where $R_0$ is the universal gas constant:

$$\gamma = C_p/C_v, \text{ and} \quad \text{(ii)}$$

$$P_2/P_1 = [2/(\gamma+1)]^{\gamma/(\gamma-1)} = r_c. \quad \text{(iii)}$$

Another embodiment of the methods for verifying process gas flow rates from a gas supply system to a plasma processing chamber comprises a) setting a first flow controller to a first set point and flowing a carrier gas at a first flow rate from the first flow controller, the carrier gas flowing at a viscous sonic flow rate through a first orifice of an orifice array into a plasma processing chamber; b) measuring a pressure ($P_1$) and temperature ($T_1$) of the carrier gas upstream of the first orifice at the first flow rate; c) measuring a cross-sectional flow area (A) of the orifice; d) determining for the carrier gas, the specific heat at constant volume ($C_v$), the specific heat at constant pressure ($C_p$), the molecular weight (M) and the absolute empirical factor $K_a$; e) calculating the flow rate Q of the carrier gas through the orifice using equations (i)-(iii) described above; e) then setting a second flow controller to a second set point and flowing a seed gas at a second flow rate from the second flow controller, the seed gas being mixed with the carrier gas to form a gas mixture which is flowed through the first orifice and into the plasma processing chamber, the second flow rate being subsonic and/or non-viscous when the seed gas alone is flowed through the first orifice; f) measuring the pressure ($P_1$) and temperature ($T_1$) of the gas mixture upstream of the first orifice; g) calculating the flow rate Q of the gas mixture through the first orifice using equation (i) and $C_v$, $C_p$, M and $K_a$ for the carrier gas; and h) comparing the value of Q of the carrier gas to the value of Q of the gas mixture to determine the flow rate of the seed gas through the first orifice.

An embodiment of a gas supply system adapted to supply process gas into a plasma processing chamber comprises a gas line adapted to be in flow communication with a gas supply section; an orifice array in flow communication with the gas line, the orifice array comprising at least two orifices; a first pressure sensor in flow communication with the orifice array, the first pressure sensor being adapted to measure a first range of gas pressure upstream of the orifice array; and a second pressure sensor in flow communication with the orifice array, the second pressure sensor being adapted to measure a second range of gas pressure upstream of the orifice array, the second range of gas pressure having an upper value which is higher than an upper value of the first range of gas pressure.

DETAILED DESCRIPTION

Plasma processing apparatuses for processing semiconductor materials, such as semiconductor devices formed on semiconductor substrates, e.g., silicon wafers, include a plasma processing chamber and a gas supply system that supplies process gas into the plasma processing chamber. Depending on the construction of the plasma processing chamber, the gas supply system can be constructed to distribute gas to a single zone, or to multiple zones, across the surface of a substrate being subjected to plasma processing.

Gas supply systems for plasma processing chambers can include flow controllers to control the flow ratio of the same process gas, different process gases, or gas mixtures, to different zones, thereby allowing in-process adjustment of across-substrate uniformity of both gas flow rates and gas composition. See, e.g., commonly-owned U.S. patent application Ser. No. 10/835,175, which is incorporated herein by reference in its entirety. However, flow controllers, such as mass flow controllers (MFCs), have a performance error. For example, MFCs typically have an error of about ±1% of the set point, which corresponds to a set flow rate, of the MFC. The magnitude of the error can vary depending on various factors including the magnitude of the set flow rate, the gas composition, and the accuracy of the MFC.

For etch processes, e.g., in order to achieve desired etch rates, selectivity and uniformity, across a substrate, and from substrate to substrate, actual process gas flow rates preferably closely approximate desired flow rates. It is also desirable to have accurate actual flow rates under different processing conditions, e.g., at different processing chamber temperatures. Flow controllers of gas supply systems are calibrated for different set flow rates and gas compositions to compensate for errors in the actual flow rates supplied by the flow controllers.

A procedure that can be used to determine the actual flow rate of a gas supplied by a flow controller of a gas supply system for a plasma processing chamber is known as the "rate of rise" technique. In this technique, a flow controller is set to a selected set point, e.g., 20% of the full scale flow, for the flow controller and gas is flowed from the flow controller at a set flow rate (i.e., the flow rate that corresponds to the set point for the flow controller) into a chamber having a known volume. The chamber can be a plasma processing chamber. The rate of pressure increase in the chamber corresponding to the rate of increase in volume of the gas in the chamber is measured. Using the ideal gas law, the rate of increase of the volume of the gas in the chamber can be determined, allowing the actual flow rate of the gas into the chamber to be determined. Any non-ideal gas compressibility effects are also corrected, which are not normally accounted for in the ideal gas law relationship. The set flow rate is compared to the actual flow rate for the set point to give a calibration point for the flow controller. This procedure can be repeated at the same set point and at different set points of the flow controller.

The rate of rise technique is performed with the plasma processing chamber at ambient condition, i.e., in a non-heated condition. However, the measurement results for this technique are affected by the temperature of the plasma processing chamber. Accordingly, it has been determined that this technique is not completely satisfactory for measuring gas flow rates when the chamber is heated and a substrate is not contained in the chamber. It has also been determined that the rate of rise technique is not completely satisfactory for the active tracking of gas flow rates during actual plasma processing operations because the chamber is in a heated condition.

In order to perform the rate of rise technique, the plasma processing chamber is first allowed to cool to ambient temperature when the chamber has been operated at a heated condition, e.g., the upper electrode and/or the lower electrode has been heated. It can typically take several hours to reach ambient conditions in the chamber. Also, test times can be as much as about 5 minutes/set point for a given gas. As the accuracy of this technique is improved by averaging multiple measurements at the selected set points, the total test time to perform a sufficient number of measurements to assure a certain level of accuracy can be significant. This test time contributes to the downtime of the chamber. Also, cycling of the chamber temperature can generate particles in the chamber. Such particles can contaminate substrates processed in the chamber and reduce process throughput.

In light of the above-described considerations, and other considerations, methods for verifying gas flow rates from a gas supply system into a plasma processing chamber are provided. Embodiments of the methods can preferably provide suitably accurate gas flow rate measurements at any chamber temperature condition.

One preferred embodiment of the methods for verifying gas flow rates from a gas supply system into a plasma processing chamber is referred to herein as the "differential flow" method. In this method, a flow controller is operated at different set points, and upstream orifice pressures are measured for each of those set points. The measured upstream orifice pressures are referenced to a chamber-based secondary flow verification method used to determine corresponding actual gas flow rates for the different set points. Preferably, the secondary flow verification measurements and the upstream orifice pressure measurements are both performed at ambient temperature chamber conditions. The chamber-based secondary flow verification measurements can also be used to determine whether the flow controller is operating within desired operating parameters and accuracy. In the differential flow method, the upstream orifice pressure measurements made at ambient temperature conditions are used as a differential comparison to subsequently measured upstream orifice pressures, which can be taken at any temperature condition of the chamber, to verify flow.

Another preferred embodiment of the methods of verifying flow from a gas supply system into a plasma processing chamber is referred to herein as the "absolute flow" method. Unlike the differential flow method, the absolute flow method does not depend on also performing a chamber-based secondary flow verification method. In the absolute flow method, some parameters of a selected gas, whose flow rate supplied by a flow controller to an orifice of an orifice array is to be measured, are predetermined from known and/or calculated values; orifice opening sizes can be pre-measured; and other parameters of the gas are measured while the gas is being flowed from a flow controller at a selected set point through an orifice. The predetermined and measured values are used to determine the actual gas flow rate through the orifice. In this method also, any flow controller set point can be flowed at any time and at any chamber condition.

Embodiments of the methods for verifying gas flow rates can be used for various gas supply systems adapted to supply process gas to a plasma processing chamber. For example, the gas supply systems can be adapted to supply different process gases and/or different gas flow rate ratios of process gases to one or more zones of the chamber. The gas supply system is adapted to be connected in flow communication with the plasma processing chamber, and to supply different gas chemistries, and/or to supply different flow rates of the gas chemistries to one or more zones within the chamber, during plasma processing operations.

The plasma processing chamber can be any suitable type of plasma reactor. The plasma processing chamber can be a low-density, medium-density or high-density plasma reactor including an energy source that uses RF energy, magnetic fields, microwaves, or the like to produce plasma. For example, the plasma processing chamber can be a parallel-plate capacitive RF etch chamber including a showerhead electrode assembly. Exemplary plasma reactors of this type are dielectric etch chambers sold under the trademarks 2300 "EXELAN", 2300 "EXELAN FLEX" and 2300 "EXELAN FLEX45" by Lam Research Corporation, located in Fremont, Calif. As another example, the plasma processing chamber can include an inductively-coupled RF source, such as helicon, helical resonators and RF antennas, and injector gas feed. Exemplary inductively-coupled plasma reactors that can be used are sold under the trademarks 2300 "VERSYS" Silicon, 2300 "VERSYS" Metal and 2300 "VERSYS KIYO" by Lam Research Corporation.

Figure 1:
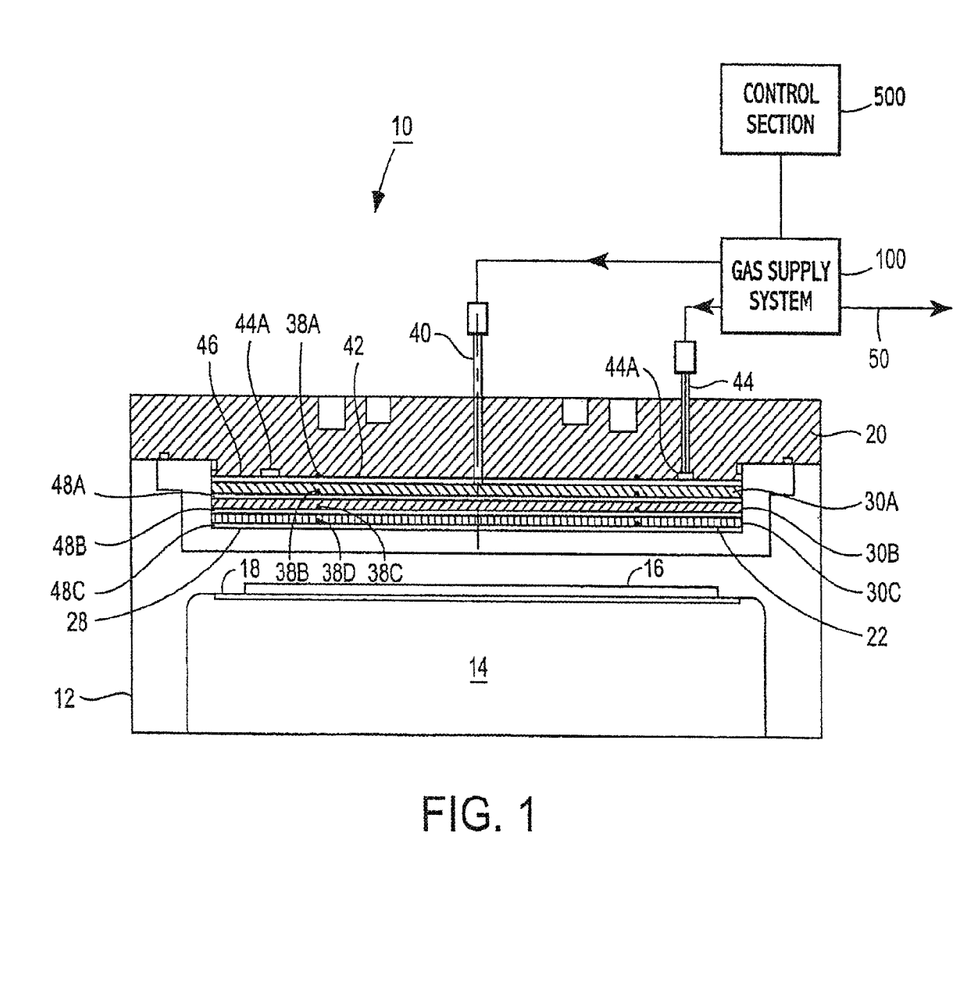
FIG. 1 illustrates an exemplary embodiment of a plasma processing apparatus.

FIG. 1 depicts an exemplary semiconductor material plasma processing apparatus 10. The plasma processing apparatus 10 includes a plasma processing chamber 12 and a gas supply system 100 in flow communication with the chamber. The plasma processing chamber 12 has an interior containing a substrate support 14 for supporting a substrate 16 during plasma processing. The substrate support 14 includes a clamping device, such as an electrostatic chuck 18, adapted to clamp the substrate 16 on the substrate support 14 during processing. The substrate can be surrounded by focus rings and/or edge rings, ground extensions or other parts, such as parts disclosed in commonly-owned U.S. Patent Application Publication No. 2003/0029567, which is incorporated herein by reference in its entirety.

The substrate 16 may include a base material, such as a silicon wafer; an intermediate layer of a material that is to be processed, e.g., etched, over the base material; and a masking layer over the intermediate layer. The substrate can include additional layers of conductive, dielectric or semiconductor materials between the base layer and the masking layer, depending on the type of semiconductor device formed on the base material. The intermediate layer may be of a conductive, dielectric or semiconductor material. The masking layer can be patterned photoresist material with an opening pattern for etching desired features, e.g., holes, vias and/or trenches, in the intermediate layer and/or one or more other layers.

Exemplary dielectric materials that can be processed include, but are not limited to, doped silicon oxide, such as fluorinated silicon oxide; un-doped silicon oxide, such as silicon dioxide; spin-on glass; silicate glasses; doped or un-doped thermal silicon oxide; and doped or un-doped TEOS deposited silicon oxide. The dielectric materials can be low-k materials, including organic and inorganic low-K materials. Such dielectric materials can overlie a conductive or semiconductor material layer, such as polycrystalline silicon; metals, such as aluminum, copper, titanium, tungsten, molybdenum and their alloys; nitrides, such as titanium nitride; and metal silicides, such as titanium silicide, tungsten silicide and molybdenum silicide.

The exemplary plasma processing chamber 12 shown in FIG. 1 includes a showerhead electrode assembly having a support plate 20 forming a wall of the plasma chamber, and a showerhead 22 attached to the support plate 20. A baffle assembly is located between the showerhead 22 and the support plate 20 to uniformly distribute process gas to a backside 28 of the showerhead 22. The baffle assembly can include one or more baffle plates. In the illustrated embodiment, the baffle assembly includes three baffle plates 30A, 30B and 30C. Open plenums 48A, 48B and 48C are defined between the baffle plates 30A, 30B and 30C; and between the baffle plate 30C and showerhead 22. The baffle plates 30A, 30B and 30C and showerhead 22 include through passages for flowing process gas into the interior of plasma processing chamber 12.

In the embodiment, the plenum between the plate 20 and the baffle plate 30A and the plenums 48A, 48B and 48C between the baffle plates 30A, 30B and 30C are divided into an inner zone 42 and an outer zone 46 by seals 38a, 38b, 38c and 38d, such as O-rings. The inner zone 42 and outer zone 46 can be supplied process gas having different respective gas chemistries and/or flow rates by the gas supply system 100, preferably under control of a control section 500. Gas is supplied from an inner zone gas supply 40 into the inner zone 42, and gas is supplied from an outer zone gas supply 44 into an annular channel 44a and then into the outer zone 46. The process gas flows through the passages in the baffle plates 30A, 30B and 30C and the showerhead 22 and into the plasma processing chamber 12.

The process gas is energized to produce plasma in the plasma processing chamber 12 by a power source, such as an RF source driving electrode 22, or one or more RF power sources, e.g., two power sources, driving an electrode in the substrate support 14. By including RF sources that can provide different frequencies, and multiple RF sources for driving the electrode in the substrate support 14, multiple frequencies can be applied to the substrate support 14 incorporating an electrode and an electrostatic chuck, with the upper electrode providing a return path. Alternatively, in dual-frequency plasma reactors, different frequencies can be applied to the substrate support and an electrode, such as a showerhead electrode.

In the plasma processing chamber 12, in order to achieve desirable process efficiency and etch uniformity, plasma can be confined within a plasma confinement zone between the upper and lower electrodes. Exemplary plasma confinement ring assemblies that can be used to provide plasma confinement are disclosed in commonly-owned U.S. Pat. Nos. 5,534,751; 5,998,932; 6,019,060; 6,178,919 and 6,527,911, each of which is incorporated herein by reference in its entirety.

Figure 2:
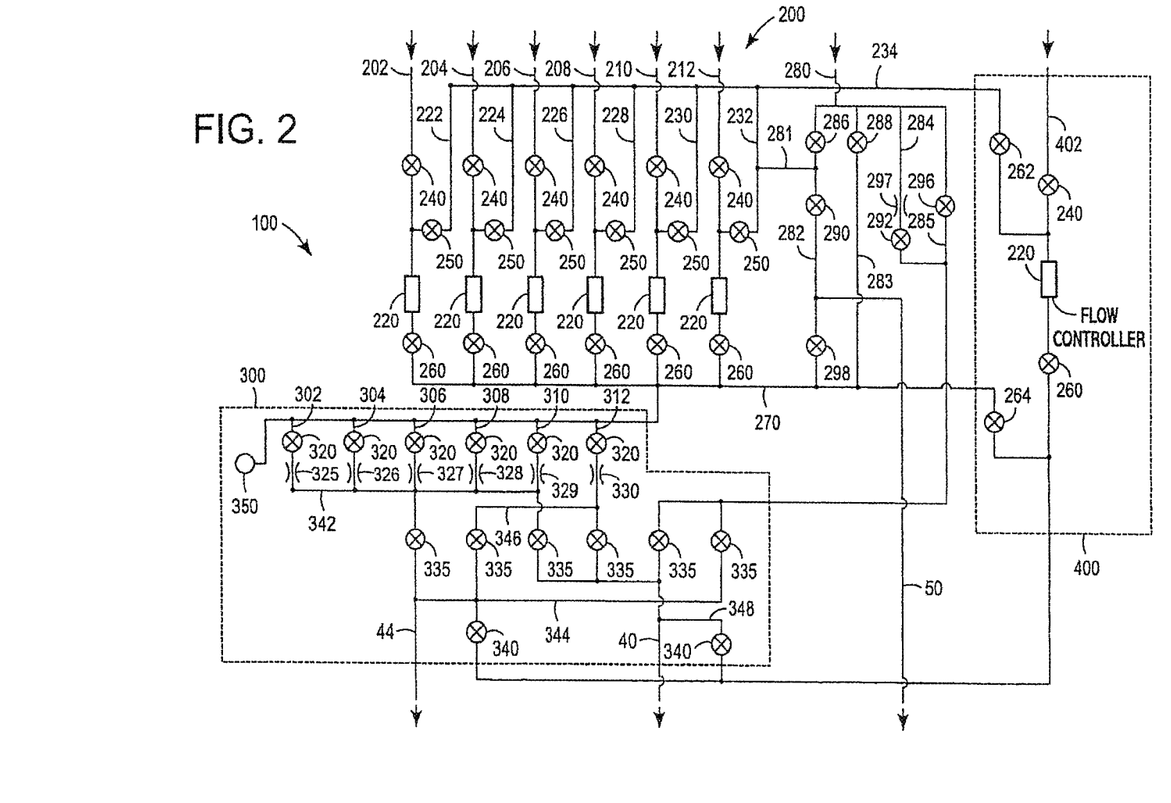
FIG. 2 illustrates an exemplary embodiment of a gas supply system for supplying gas to a plasma processing system.

As depicted in FIG. 2, the embodiment of the gas supply system 100 includes a gas supply section 200 adapted to supply different gases, such as individual process gases, or various mixtures of two or more process gases, to a flow verification section 300 downstream of the gas supply section 200. The flow verification section 300 can adjust the ratio of the process gas supplied to the inner zone 42 and the outer zone 46 of the plasma processing chamber 12 via the inner zone gas line 40 and the outer zone gas line 44, respectively.

As shown in FIG. 1, the gas supply system 100 is preferably connected to a control section 500. The control section 500 is preferably operable to control the operation of flow control components of the gas supply system 100, including valves, flow controllers, pressure sensors and temperature sensors, to allow control of the flow path and the composition and ratios of gases that are supplied by the gas supply section 200 to the flow verification section 300 and ultimately to the plasma processing chamber 12. The control section 500 preferably is adapted to control flow control components of the gas supply system 100 and to perform numerical calculations to allow the automatic performance of steps of the methods of flow verification described herein. For example, the control section 500 can include suitable hardware and software to provide control of flow control components, to receive output signals from the components, and to perform associated numerical calculations using inputted predetermined and measured values to enable the performance of embodiments of the methods.

The control section 500 can include any suitable device(s) for performing such operations during flow verification. Computer readable program codes can be embodied in any computer readable medium, or by connection to a computer based system, processor containing system or other system that can retrieve instructions and execute instructions. The computer readable medium can be any means that can contain, store, communicate, propagate or transport the program for use by, or in connection with the system. The computer readable medium can be, e.g., an electronic, magnetic, optical, electromagnetic, infrared or semiconductor system, apparatus, device or medium. Exemplary computer readable media include a portable computer diskette, a random access memory (RAM), a read only memory (ROM), a hard disk, a standalone storage device, or the like. The computer readable medium can be capable to implementing one or more of the flow verification methods described herein.

In the embodiment, the gas supply section 200 includes gas lines 202, 204, 206, 208, 210 and 212, each of which can be in fluid communication with a different gas source. As such, the gas supply section 200 can supply multiple different individual process gases and process gas mixtures to the plasma processing chamber 12, allowing a large number of different semiconductor plasma processing operations to be run in the chamber. The number of gas sources included in the gas supply system 100 is not limited to any particular number of gas sources. For example, the gas supply section 200 can alternatively include more than, or less than, the six gas sources of the embodiment shown in FIG. 2. For example, the gas supply section 200 can include two, three, four, five, ten, twelve, sixteen, or more gas sources. Different gases that can be provided by the respective gas sources include individual gases, such as $O_2$, Ar, $H_2$, $Cl_2$, $N_2$, He, Ne and the like, as well as gaseous compounds, such as gaseous fluorocarbon and/or fluorohydrocarbon compounds. In one exemplary embodiment, the plasma processing chamber 12 is an etch chamber and the gas sources can supply Ar, $O_2$, $N_2$, $Cl_2$ and two gases selected from $CH_3$, $CF_4$, $C_4F_8$, $CH_3F$ and $CHF_3$ (in any suitable order thereof) to the gas lines 202, 204, 206, 208, 210 and 212. The particular gases supplied by the respective gas sources of the gas supply section 200 can be selected based on particular plasma processing processes that are performed in the plasma processing chamber 12, e.g., particular dry etching and/or material deposition processes. Accordingly, the gas supply section 200 can provide broad versatility regarding the choice of gases that are available for performing these processes.

In the embodiment, the gas supply system 100 also includes a tuning gas section 400 adapted to supply at least one tuning gas to enable adjustment of the composition of the process gas that is supplied to the plasma processing chamber 12. The tuning gas can be, e.g., $O_2$, an inert gas, such as argon or He, or a reactive gas, such as a fluorocarbon or fluorohydrocarbon gas, e.g., $C_4F_8$. The tuning gas section 400 includes a tuning gas line 402 in communication with a tuning gas source.

In the embodiment, a flow controller 220 is arranged along each of the gas lines 202, 204, 206, 208, 210 and 212, and along the gas line 402 of the tuning gas section 400. Each of the flow controllers 220 is operable to supply a gas from an associated gas source over a range of set flow rates into the chamber. The flow controllers 220 are preferably mass flow controllers (MFCs). The flow controllers 220 can each be selected to provide a desired range of gas flow rates, such as from about 1 sccm to about 2000 sccm for dielectric etch applications.

In the embodiment, the gas supply section 200 includes gas lines 222, 224, 226, 228, 230, 232 and 234 in flow communication with a gas line 281, which in turn is in flow communication with the pump-purge system (gas lines 280 and 282). During wafer processing, the tuning gas section 400 supplies the tuning gas to either center or edge zones at the valves 340. The tuning gas section 400 also includes a valve 264, which can be opened to supply the tuning gas directly to the manifold 270 for gas flow verification during system maintenance operations.

In the embodiment, valves 240, 260 are located upstream and downstream, respectively, of the flow controllers 220 along the gas lines 202, 204, 206, 208, 210, 212 and 402. Valves 250 are arranged along the gas lines 222, 224, 226, 228, 230 and 232 and valve 262 is arranged along gas line 234. The valves 240, 260 can be selectively opened or closed to control flow of different gases to the gas manifold 270, or to add tuning gas at gas line 344 or 348. The valves 250 and 260 can be selectively opened or closed to pump-purge gas lines 202, 204, 206, 208, 210, 212 and 402. The valves 240, 250 and 260 can be under automatic control of the control section 500.

For example, by opening the valves 240, 260 associated with one or more of the gas sources supplying gas lines 202, 204, 206, 208, 210 and 212, a selected single gas or a gas mixture can be supplied to the gas manifold 270. Accordingly, various individual gases, gas mixtures and mass flow rates of process gases can be supplied to the manifold 270 by controlled operation of the gas supply section 200. The gas supply section can be under control of the control section 500.

In the embodiment, the gas supply system 100 also includes a purge gas supply including a purge gas line 280 for supplying a purge gas to the gas line 232 via gas line 281; to the gas manifold 270 via gas line 283; into the plasma processing chamber 12 via the inner zone gas line 40 and/or the outer zone gas line 44; or to vacuum via the vacuum line 50. As shown, valves 286, 290 and 298 are arranged along gas line 282; valve 288 is arranged along gas line 283; an orifice 297 and a valve 292 are arranged along gas line 284; and a valve 296 is arranged along gas line 285, to provide selective control of the distribution of the purge gas. These valves can be under automatic control of the control section 500.

In the embodiment, the flow verification section 300 includes gas lines 302, 304, 306, 308, 310 and 312, each including a valve 320, and also an orifice 325, 326, 327, 328, 329 and 330 of an orifice array, respectively, arranged downstream of the valve 320. A gas line 342 interconnects the gas lines 302, 304, 306, 308, 310 and 312. Valves 335 are arranged along the gas lines 306, 346, 310, 312, 285 and 344, and valves 340 are arranged along the gas lines 346 and 348.

In the flow verification section 300, each of the orifices 325-330 of the orifice array preferably has a fixed restriction size, i.e., a fixed gas flow opening size, for gas flow through the orifice. The orifices 325-330 restrict gas flow and can maintain an approximately constant gas pressure in the respective gas lines 302, 304, 306, 308, 310 and 312 (as also can orifice 297 arranged along gas line 284) upstream of, and proximate, the respective orifices. The orifices 325-330 can dampen pressure surges and flow instabilities in the gas flow when the gas supply system 100 changes the gas composition and/or flow rate flowed into the plasma processing chamber 12. The orifices 325-330 of the orifice array can have different respective cross-sectional gas restriction sizes, e.g., a different diameter or a different cross-sectional area. For example, the orifices 325, 326, 327, 328 and 329 can have respective diameters of 0.007 in., 0.010 in., 0.015 in., 0.020 in., 0.030 in., and orifice 330 can have a diameter of 0.030 in. The gas restriction sizes of the orifices 325-330 are smaller than the sizes of the gas flow paths of the gas lines of the gas supply system 100.

The orifices are preferably sized to provide viscous sonic flow conditions for process gas flow. As described in greater detail below, during flow rate verification, gas flows through the orifices 325-330 are preferably at the critical viscous flow regime in the flow verification section 300 to allow the flow conductance of a given orifice 325-330 to be determined by its restriction size and upstream pressure, without having to also determine downstream orifice pressure.

The number of orifices of the orifice array in the flow verification section 300 can include more than six orifices as shown in FIG. 2, or less than six orifices. For example, the orifices 326, 328 can be replaced by a single orifice that provides about the same flow conductance as the total flow conductance of the two orifices 326, 328, or the orifice 329 can be replaced by two or more orifices providing about the same total flow conductance as that of the orifice 329.

The valves 320 located upstream of each of the respective orifices 325-330 control the flow of the process gas from the gas supply section 200. One or more of the valves 320 can be opened to allow flow of the gas to one or more of the associated orifices 325-330. By selective control of the valves 335 arranged along the gas lines 306, 346, 310 and 312, process gas can be supplied to the outer zone gas line 44 and the inner zone gas line 40 at selected flow ratios. For example, 0-100% process gas flow can be supplied to either the inner zone gas line 40 or the outer zone gas line 44 while 100%-0 gas flow of the process gas is supplied to the other of the inner zone gas line 40 and the outer zone gas line 44. Accordingly, process gas flows to the inner zone 40 and the outer zone 44 can be tailored for various substrate processing operations.

Figure 3:
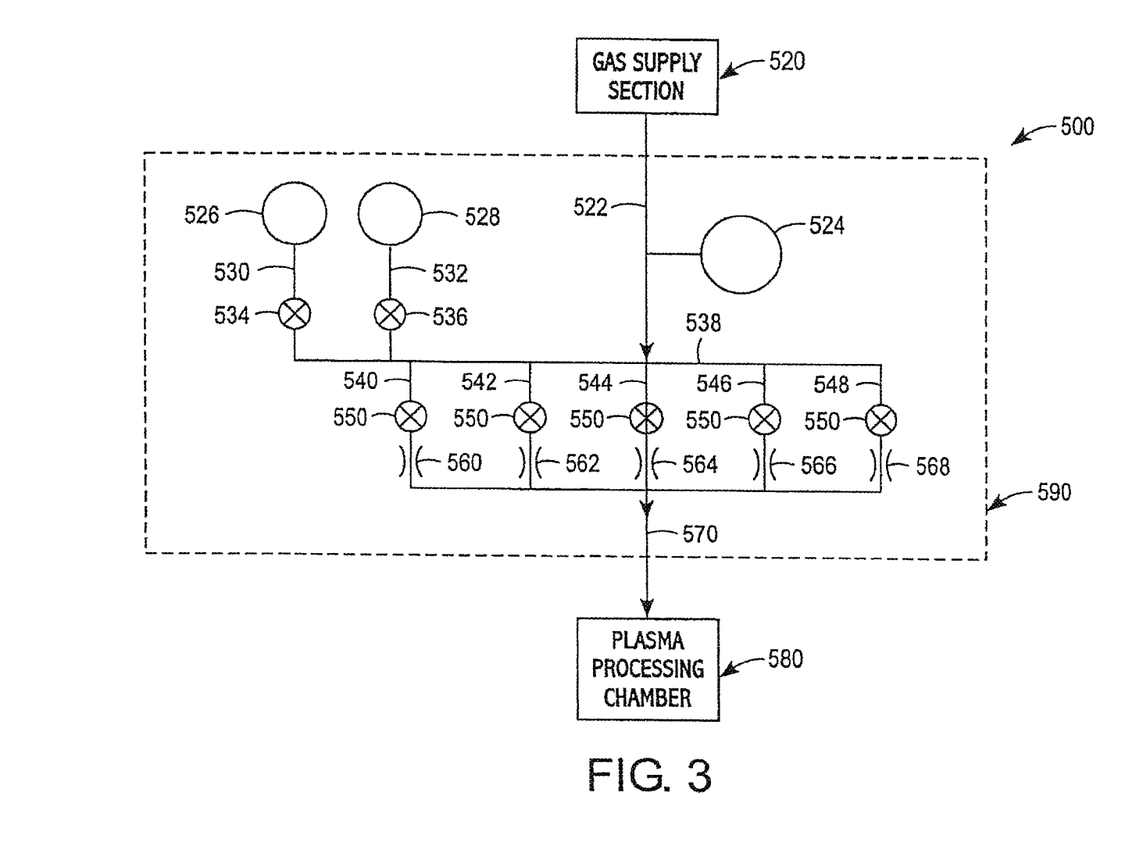
FIG. 3 illustrates an exemplary embodiment of a flow verification section in flow communication with a gas supply section and a plasma processing chamber.

FIG. 3 shows an exemplary embodiment of a flow verification section 590 in flow communication with an upstream gas supply section 520 via a gas line 522, and with a downstream plasma processing chamber 580 via a gas line 570. The flow verification section 590 includes gas lines 540, 542, 544, 546 and 548, each including a valve 550, and also an orifice 560, 562, 564, 566 and 568, respectively. A gas line 538 interconnects the gas lines 540, 542, 544, 546 and 548.

The flow verification section 590 includes pressure sensors 526, 528 in flow communication with the gas line 538 via gas lines 530, 532, respectively. Valves 534, 536 are arranged along the gas lines 530, 532. The pressure sensors 526, 528 can measure different gas pressure ranges. For example, the pressure sensor 526 can measure pressures of up to about 500 Torr, and the pressure sensor 528 can measure pressures of up to about 50 Torr. The pressure sensors 526, 528 are preferably under control of a control section. In the embodiment, based on the predicted upstream gas pressure for one of the respective orifices 560, 562, 564, 566 and 568 for a set gas flow rate supplied from a flow controller of the gas supply section 520, the pressure sensor 526 or 528 operates to sense the upstream gas pressure by opening of the associated valve 534 or 536, respectively. The gas temperature of the gas supplied from the gas supply section 520 is measured by the temperature sensor 524. The pressure sensors 526, 528 and temperature sensor 524 are operable to supply signals to the control section to allow upstream orifice pressures and gas temperatures to be determined in the flow verification section 590.

As described above, an embodiment of the methods of verifying gas flow rates from a gas supply system into a plasma processing system is the "differential flow method."

In this method, a chamber-based secondary flow verification method is used to determine actual flow rates of a process gas supplied by the gas supply system 100 into the plasma processing chamber 12. The chamber-based secondary flow verification method is preferably the rate of rise method. In this method, gas is flowed into the plasma processing chamber 12, which has a predetermined gas capacity (volume), and the associated rate of pressure increase in the chamber is measured. The behavior of most gases can be described by the ideal gas law, as follows:

$$PV=nRT \quad (1)$$

In equation (1), P is the gas pressure, V is the gas volume, n is the number of moles of the gas, R is the universal gas constant (8.3 J·K$^{-1}$·mol$^{-1}$) and T is the gas temperature. The rate of pressure increase, $\Delta P/\Delta t$, is measured, and the rate of increase of the amount of the gas in the chamber, $\Delta n/\Delta t$, is calculated and converted to the flow rate of the gas. A compressibility correction is made to equation (1) for gases that behave non-ideal at high flows.

Referring to FIG. 2, the flow controllers 220 can be tested by the rate of rise technique to determine the relationship between set gas flow rate and actual gas flow rate for the flow controllers. For example, to test the flow controller 220 arranged along the gas line 202, the valve 240 along gas line 202 is opened, while the valves 250 and 240 arranged along gas lines 204, 206, 208, 210, 212 and 402 are closed. Valve 260 along gas line 202 is opened, while the valves 260 arranged along gas lines 204, 206, 208, 210, 212 and 402 are closed. Gas is flowed from the gas line 202 via the flow controller 220 to one of the orifices 325-330 of the flow verification section 300 and into the plasma processing chamber 12. For example, to flow gas into the plasma processing chamber 12 via the orifice 325, the valve 320 along gas line 302 is opened, and the valves 320 along gas lines 304, 306, 308, 310 and 312 are closed. Assuming, e.g., that the flow controller 220 has a 100% flow rate of 200 sccm, a rate of rise measurement can be taken at two or more set points within the range of the flow controller 220, such as at set points of 10%, 20%, 30%, 40%, 50%, 60%, 70%, 80%, 90% and 100% of full scale (e.g., 200 sccm). Multiple gas flow rate measurements, e.g., 2, 3 or more measurements, can be taken at one or more of these set points for increased accuracy. Depending on the set point of the flow controller 220 that is tested, gas is flowed to an appropriate one of the orifices 325-330 for that gas flow rate. The orifice is selected to create a viscous sonic flow condition for the particular gas flow rate supplied by the flow controller. The orifice selection preferably can be made by the control section 500, which can include suitable software for performing such orifice selection.

The rate of rise measurement results are used to determine a relationship between set flow rates and actual flow rates to calibrate a flow controller. Corrections to account for the compressibility effect of non-ideal gas behavior are also incorporated into this relationship. The relationship can have the following exemplary form:

$$Q_A=A(Q_S)^2+B(Q_S)+C \quad (2)$$

In equation (2), $Q_A$ is the actual flow rate, $Q_S$ is the set flow rate, and A, B and C are constants determined from a quadratic fit of the data. This calculation can be performed by the control section 500. A quadratic data fit is desirable because various gases at low flow (e.g., SiCl$_4$, HBr and Cl$_2$) can show significant offsets in the flow error, and at high flow various gases exhibit non-linear compressibility offsets in the flow error. This error may cause any relationship between the set flow rate and actual flow to be non-linear. The non-linear quadratic fit is believed to take into account such error. If the flow controller is replaced, the calibration is re-done. Accordingly, the calibration is preferably performed before the flow controller is used for actual substrate processing.

Figure 4:
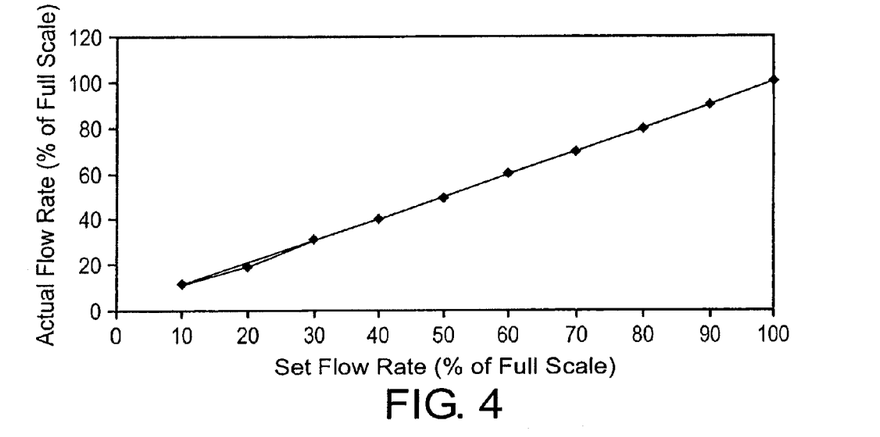
FIG. 4 shows an exemplary relationship between actual flow rate versus set flow rate for a flow controller.

An exemplary curve of actual flow rate versus set flow rate over the range of 10% to 100% of the set point for a flow controller is shown in FIG. 4.

The plasma processing chamber 12 is preferably at ambient temperature during each of the rate of rise measurements. For example, the temperatures of the upper and lower electrodes can be set to a temperature of about 20° C., and the plasma processing chamber 12 can be allowed to sit idle to allow the chamber to cool to ambient temperature. The plasma processing chamber 12 can be maintained at a pressure of, e.g., 1 millitorr or less in the idle condition. Preferably, optional heating and cooling systems for the upper and lower electrodes are turned off and the chamber is allowed to sit idle for at least two hours, and more preferably at least 12 hours or more, to allow the chamber to reach ambient temperature conditions.

The rate of rise measurements can be performed for each of the flow controllers 220 of the gas supply system 100 to determine the relationship between set gas flow rate and actual gas flow rate. For a given flow controller 220, different orifices of the orifice array can be used individually to measure the full scale of gas flow.

In the embodiment, the upstream orifice pressure is measured for each set point of the flow controller(s) determined by the rate of rise technique, using the same gas. To reduce the duration of the flow verification method, the upstream orifice pressure can be measured while gas is being flowed into the chamber for the rate of rise measurements.

In another embodiment of the differential flow method, after the gas flows for the rate of rise measurements have been performed, the same gas is flowed from the same flow controller 220 at the same set points. That is, the pressure measurements for the set points are not taken as the gas is flowed into the plasma processing chamber for the rate of rise measurements. The upstream orifice pressures are measured once the pressure stabilizes. To minimize flow controller drift effects, the pressure measurements are preferably taken shortly after the rate of rise measurements have been made, e.g., within about 30 minutes of making the rate of rise measurements.

As shown in FIG. 2, a pressure sensor 350, such as a capacitive manometer, is arranged in flow communication with each of the gas lines 302, 304, 306, 308, 310 and 312. The pressure sensor 350 is operable to measure the upstream gas pressure for each of the respective orifices 325-330 when gas is flowed through the orifices. The pressure sensor 350 can have a suitable pressure measurement range to be able to measure the upstream orifice pressures.

For example, as described above, gas can be flowed from the flow controller 220 arranged along the gas line 202 to the plasma processing chamber 12 at set points of 10%, 20%, 30%, 40%, 50%, 60%, 70%, 80%, 90% and 100% of full scale. Depending on the set point of the flow controller 220, the gas is flowed to an appropriate one of the orifices 325-330. The orifice selection for the different set points can be automatically made by the control section 500 using predetermined, measured and/or calculated information.

For a given flow controller 220 and gas, the measured gas pressures are used to determine an empirical factor for the flow controllers 220 based on the set flow rates and the measured gas pressures for each of the set flow rates. The following relationship between set flow rate and upstream pressure for a given flow controller and a given orifice can be determined:

$$Q_{S,O} = A_O(P_O)^2 + B_O(P_O) + C_O \qquad (3)$$

In equation (3), $Q_{S,O}$ is the set flow rate, $P_O$ is the upstream pressure of the orifice, and $A_O$, $B_O$ and $C_O$ are constants for a specific gas and orifice determined from a quadratic fit of the data. The pressure versus set flow rate relationship may be affected by gas flow in transitional (non-viscous) state or by gas compressibility. The non-linear quadratic fit of equation (3) is believed to take into account such error. The constants $A_O$, $B_O$ and $C_O$ can be re-used if a given flow controller is replaced.

Figure 5:
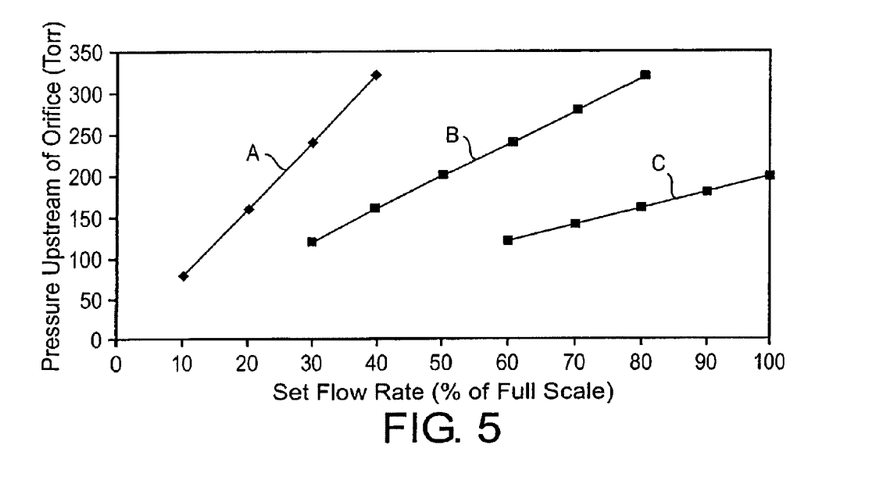
FIG. 5 shows an exemplary relationship between upstream orifice pressure and set flow rate for three different nozzles.

Exemplary curves A, B and C of upstream orifice pressure versus set flow rate for three different orifices over the range of 10% to 100% of the set point for a flow controller is shown in FIG. 5. There is overlap between curves A and B (between set points of 30% to 40%) and between curves B and C (between set points of 60% to 80%). Based on the curves, orifice A is preferably used for 10% to 40% flow (due to its higher sensitivity than orifice B), orifice B is preferably used for 40% to 80% flow (due to its higher sensitivity than orifice C), and orifice C is preferably used for 80% to 100% flow.

The actual gas flow rates measurements determined by the rate of rise technique and the measured gas pressures for the different set points of the flow controllers can then be used to calculate an empirical factor for each flow controller. Viscous flow of a gas through an orifice can be represented by the equation (4). See A. Roth, *Vacuum Technology*, Elsevier, p. 69, 1990, which is incorporated herein by reference in its entirety.

$$Q = AP_1\left(\frac{P_2}{P_1}\right)^{1/\gamma}\left\{\left(\frac{2\gamma}{\gamma-1}\right)\frac{R_0T_1}{M}\left[1-\left(\frac{P_2}{P_1}\right)^{(\gamma-1)/\gamma}\right]\right\}^{1/2} \qquad (4)$$

In this equation, Q is the gas flow rate through the orifice, A is the cross-sectional flow area of the orifice, $P_1$ is the upstream pressure, $P_2$ is the downstream pressure, $R_0$ is the universal gas constant, T is the gas temperature, and M is the molecular weight of the gas.

Also, in equation (4):

$$\gamma = C_P/C_V \qquad (5)$$

where $C_P$ and $C_V$ are the specific heat of the gas at constant pressure and volume, respectively.

At choked or viscous sonic flow through an orifice, the upstream orifice pressure, $P_1$, is independent of the downstream pressure, $P_2$. At viscous sonic flow conditions, the pressure ratio of $P_2/P_1$ can be represented by the equation (6) below. See Roth, *Vacuum Technology*, at page 72.

$$P_2/P_1 = [2/(\gamma+1)]^{\gamma/(\gamma-1)} = r_c \qquad (6)$$

For $P_2/P_1$ ratios<$r_c$, $P_2$ variation does not vary flow across the orifice.

For absolute flow verification, the following equation applies:

$$Q = AP_1\left(\frac{P_2}{P_1}\right)^{1/\gamma}\left\{\left(\frac{2\gamma}{\gamma-1}\right)\frac{R_0T_1}{M}\left[1-\left(\frac{P_2}{P_1}\right)^{(\gamma-1)/\gamma}\right]\right\}^{1/2} \cdot K_a \qquad (7)$$

where $K_a$ is the absolute flow empirical factor. $K_a$ can account for variations in gas flow from viscous sonic flow conditions, for non-ideal gas compressibility, and for orifice discharge factors that determine effective orifice area versus physical orifice area for various gases and flows.

For differential flow verification, the following equation applies:

$$Q = K_d P_1 \tag{8}$$

In equation (8), $K_d$ is the differential flow empirical factor equal to the quadratic curve of $P_1$ versus Q for a flow controller. $K_d$ is preferably determined for each flow controller, gas and orifice of the flow verification section 300. $K_d$ is preferably determined using multiple set points of the flow controller, e.g., at ten set points at 10% increments of the full scale of the flow controller (e.g., at 10%, 20%, 30%, 40%, 50%, 60%, 70%, 80%, 90% and 100% of full scale). $K_d$ can account for variations in gas flow from viscous sonic flow conditions, for non-ideal gas compressibility, and for orifice discharge factors that determine effective orifice area versus physical orifice area for various gases and flows. Once $K_d$ is determined, a given flow controller can be verified by selecting a set point for the flow controller and measuring $P_1$ while flowing the gas through an appropriate orifice for that gas flow rate to achieve viscous sonic flow conditions.

Once the relationship between upstream orifice pressure and actual gas flow rate is established for a given flow controller, gas and orifice, the chamber-based secondary flow verification method does not need to be repeated. The chamber-based secondary flow verification method is preferably repeated when a different flow controller and/or a different gas composition is used. Using equation (8), subsequently-made gas flow rate measurements for the flow controller and gas can be made at any time, regardless of the plasma processing chamber temperature, because the flow rate measurements are made external to the chamber and, consequently, do not depend on the chamber conditions. Accordingly, subsequent gas flow rate measurements can be made at ambient or elevated chamber temperatures, e.g., before or during plasma processing of a semiconductor substrate. Also, the gas flow rate measurements can be made with polymer deposit build up on surfaces of the chamber. In the embodiment, there is no substantial chamber-related process shift to consider. In addition, both the differential and absolute flow methods can provide system real-time transient gas flow rate values.

The embodiment of the gas supply system shown in FIG. 2, when used with the differential flow verification method, can typically provide the following accuracy and precision values: accuracy: ≤±6% at >5 sccm gas flow, ≤±10% at 1-5 sccm gas flow; precision (i.e., measurement repeatability): ≤±1% at >5 sccm gas flow, ≤±4% at 1-5 sccm gas flow. However, the combined error of the rate of rise method and the MFC performance is typically as high as 5%. A more accurate flow verification can be established by using the absolute flow method.

As described above, the differential flow and absolute flow methods preferably utilize viscous sonic flow conditions through the orifices of the orifice array. However, at low gas flow rates, it can be difficult to achieve viscous sonic flow conditions through any one of the orifices of the orifice array. Also, at such low flow rates, the accuracy of pressure measurements can be reduced as compared to at higher flow rates. For example, it may be difficult to achieve viscous sonic flow conditions and accurately measure flow rates at set gas flow rates of less than about 10 sccm.

It has been determined that a second gas, or "carrier gas," can be used to enhance the accuracy of gas flow rate measurements for other gases that are supplied from a flow controller to an orifice array at a low flow rate. Accordingly, in another preferred embodiment of the methods of verifying flow from a gas supply system into a plasma processing chamber, two different gases are flowed simultaneously from two respective flow controllers to an orifice array of a gas supply system. The gases are combined upstream of the orifice array so that a mixture of the gases is flowed to the orifice array. The first gas, or "seed gas," of the gas mixture is a gas whose flow rate through an orifice of the orifice array is to be verified. For example, the seed gas can be a tuning gas supplied by the tuning gas section 400. The seed gas can be, e.g., Ar, $O_2$, $N_2$, $Cl_2$, $CH_3$, $CF_4$, $C_4F_8$, $CH_3F$ or $CHF_3$. The seed gas typically makes up a minor portion of a process gas mixture and has a low flow rate. The carrier gas of the gas mixture is flowed at a higher flow rate than the seed gas to provide for accurate measurement of the flow rate of the seed gas. The composition of the carrier gas is not particularly limited, but it is preferably a gas that exhibits ideal gas-like behavior. For example, the carrier gas can be Ar, $N_2$, He, Ne or the like.

The seed gas is flowed from a flow controller at a low flow rate. The "low flow rate" is a flow rate of the seed gas that is less than an approximate minimum flow rate above which viscous sonic flow conditions through an orifice of the orifice array can be produced. At low flow rates of the seed gas, the upstream orifice pressure created by the seed gas flow may not be sufficiently high to be accurately measured by pressure sensors that are designed for measuring higher gas pressures. At flow rates of the seed gas that are sufficiently high to produce viscous sonic flow conditions through the orifice, orifice upstream pressures corresponding to the seed gas flow can be accurately measured. Accordingly, in such cases, addition of the carrier gas is not needed to be able to accurately measure the flow rate of the seed gas. By combining the seed gas with the carrier gas, which is flowed at a significantly higher flow rate than the seed gas, thereby creating a significantly higher pressure upstream of the orifice than when the seed gas is flowed alone through the orifice, the upstream orifice pressure can be accurately measured with pressure sensors that are less accurate at the lower pressures that are attributed to the seed gas alone.

Referring to FIG. 2, e.g., the carrier gas can be flowed from one of the gas sources supplying gas lines 202, 204, 206, 208, 210 and 212, and the seed gas can be flowed from another one of the gas sources, to one of the orifices 325-330. The two gases are mixed in the gas manifold 270 upstream of the orifices. The gas pressure upstream of the orifice is measured using the pressure sensor 350.

In the embodiment, the flow rate of the gas mixture can be measured using either the differential flow method or the absolute flow method. Regarding the differential flow method, the carrier gas is preferably first flowed alone from a flow controller to a selected orifice of the orifice array. The actual flow rate of the carrier gas at a selected set point of the flow controller can be determined by a suitable method, such as the rate-of-rise technique. The actual flow rate of the carrier gas is determined for at least two set points of the flow controller. Then, flow of the carrier gas is allowed to reach steady state behind the orifice array so that pressure is stable at the upstream side of the array. Then, the same set points of the flow controller are flowed for the carrier gas, and the corresponding upstream orifice pressures are measured. The actual flow rates and corresponding upstream orifice pressures can be used to determine the empirical factor K, as described above.

Then, a mixture of the carrier gas and seed gas is flowed from two different flow controllers to the orifice array. The same set points of the flow controller can be flowed for the carrier gas, and selected set points of the other flow controller can be flowed for the seed gas. Once steady state flow is achieved, corresponding upstream orifice pressures are measured for the gas mixture. The corresponding increase in the upstream pressure of the gas mixture as compared to the carrier gas flowed alone represents the contribution of the seed gas. The flow rate of the seed gas can be determined from this pressure difference.

In another embodiment, the differential flow method can be used to detect malfunctioning flow controllers and to verify that newly-installed flow controllers are working correctly. When the orifice bank is replaced, the differential flow method can be performed to determine whether it may be desirable to re-establish the pressure versus orifice relationship for the replacement orifice bank. For example, when the orifice bank is replaced, assuming that the flow controllers have not been replaced since the last calibration, the differential flow method can be performed to determine whether there is any difference in measured flow as compared to the previous orifice bank. If no change, or a suitably minor change, in measured flow is found, then recalibration of the replacement orifice bank is not needed.

As described above, another preferred embodiment of the methods of verifying gas flow rates from a gas supply system into a plasma processing chamber is the absolute flow method. This method does not use a chamber-based secondary flow verification method, such as the rate of rise method, to provide a point of comparison. In the absolute flow method, a preliminary, one-time calibration of the orifices to be used for testing is performed. The diameter of the cross-sectional flow area of the orifice is measured to a desired level of accuracy, preferably within a tolerance of about 0.00001 in. (0.25 micron). In addition, the gas flow is accurately produced in a laboratory setting, preferably within ≤0.5% accuracy. Any method can be utilized to produce the gas flows to international standards. The methods preferably account for effects due to ideal, non-ideal gas behaviors, as well as compressibility, and other gas effects. In the laboratory setting, values for $K_a$ are calculated for all foreseeable gases and flows. The same $K_a$ values are then used for all subsequent absolute flow verifier hardware sets, and do not need to be determined again. This process can eliminate the dependence on chamber-based reference calibrations, which are used for the differential flow verification method.

In this method, constants in equation (7) can be determined from known and/or calculated values for a given gas. These constants include $r_c$ (which is determined from $C_P$ and $C_V$ constant values for each gas), R and M.

In this method, once the upstream orifice pressure stabilizes, the variables $T_1$ and $P_1$ in equation (7) are measured in the gas supply system 100 while gas is being flowed from a flow controller at a set flow rate through an orifice. The gas temperature $T_1$ can be measured at any suitable location in the gas supply system 100, such as at the gas manifold 270, or close to the inlet of the orifice. Any suitable temperature sensor, such as a thermocouple, resistance temperature detector (RTD), or the like, can be used to measure gas temperature.

Using the determined values for each of the variables on the right side of equation (7), the actual flow rate can be calculated. In the absolute flow method, any flow controller set point can be flowed at any time and at any chamber temperature condition.

The embodiment of the gas supply system shown in FIG. 2, when used with the absolute flow verification method, can typically provide the following accuracy and precision values: accuracy: ≤±2% at >5 sccm gas flow, ≤±5% at 1-5 sccm gas flow; precision: ≤±1% at >5 sccm gas flow, ≤±4% at 1-5 sccm gas flow. The absolute flow method can typically provide a higher level of accuracy than the differential flow method due to the higher accuracy of the $K_a$ value (e.g., less than about 0.5% error) than the flow rate values measured by the rate of rise method for calculating $K_d$ (e.g., from about 3% to 5%).

The embodiment of the gas supply system shown in FIG. 3, when used with the absolute flow verification method, can typically provide the following accuracy and precision values: accuracy: ≤±1.25% for gas flows down to 1 sccm; precision: ≤±0.5% for gas flows down to 1 sccm. This embodiment can utilize hardware dedicated to only measuring gas flow, or can be utilized in modified configurations of the embodiment of the gas supply system shown in FIG. 2 to obtain a higher accuracy of flow verification.

In another embodiment, the absolute flow method can be used to verify gas flow rates when using a gas mixture of a carrier gas and a seed gas flowed at a low flow rate. In the embodiment, the gas mixture is sonically or supersonically expanded through an orifice in viscous flow. The low percentage seed gas constituent is accelerated or decelerated to have the same average velocity as the carrier gas. As the seed gas makes up a small portion of the gas mixture, in the embodiment, it is assumed that the contribution from the physical parameters of the seed gas to the gas mixture can be neglected in the flow calculation using equation (7). That is, in equation (7), the parameters $C_p$, $C_v$ and M are determined for the carrier gas alone and not for the gas mixture.

The present invention has been described with reference to preferred embodiments. However, it will be readily apparent to those skilled in the art that it is possible to embody the invention in specific forms other than as described above without departing from the spirit of the invention. The preferred embodiments are illustrative and should not be considered restrictive in any way. The scope of the invention is given by the appended claims, rather than the preceding description, and all variations and equivalents which fall within the range of the claims are intended to be embraced therein.

What is claimed is:

1. A method for verifying process gas flow rates from a gas supply system to a plasma processing chamber, the method comprising:
   a) setting a first flow controller to a first set point and flowing a gas at a first set flow rate from the first flow controller, the gas flowing through a first orifice of an orifice array into a plasma processing chamber;
   b) setting the first flow controller to a second set point and flowing the gas at a second set flow rate from the first flow controller, the gas flowing through the first orifice into the plasma processing chamber which is at ambient temperature;
   c) setting the first flow controller to a third set point and flowing the gas at a third set flow rate from the first flow controller, the gas flowing through the first orifice into the plasma processing chamber;
   d) for the first, second and third set flow rates, measuring first, second and third actual flow rates, respectively of the gas into the plasma processing chamber;
   e) measuring a pressure of the gas upstream of the first orifice at the first, second and third set flow rates, respectively;
   f) determining an empirical factor Kd for the first, second and third set flow rates and first orifice using the first, second and third actual flow rates;
   g) repeating a)-f) for at least a second orifice of the orifice array;

h), subsequent to f), verifying a flow rate of the gas from the first flow controller or a second flow controller into the plasma processing chamber by flowing the gas at a selected flow rate from the first or second flow controller through the first orifice, measuring the pressure of the gas upstream of the first orifice at the selected flow rate, and determining the actual flow rate of the gas at the selected set flow rate using the measured gas pressure and Kd for the first orifice, to thereby verify operation of the first or second controller; and wherein the actual flow rate of the gas is determined by measuring the rate of pressure increase in the plasma processing chamber as the gas is flowed into the plasma processing chamber at each of the first set flow rate and second set flow rate.

2. The method of claim 1, wherein the gas is flowed through the first orifice at a viscous sonic flow rate.

3. The method of claim 1, wherein for a)-d), the plasma processing chamber is at ambient temperature, and for g), the plasma processing chamber is at a temperature above ambient temperature.

4. The method of claim 3, wherein h) is performed before or during plasma processing of a semiconductor substrate in the plasma processing chamber and the plasma processing comprises flowing the gas from a selected flow controller through the first orifice into the plasma processing chamber containing a semiconductor substrate.

5. The method of claim 1, comprising repeating a)-f) for the first orifice and the same gas.

6. The method of claim 1, wherein the plasma processing chamber comprises inner and outer zones through which process gas is supplied by a showerhead electrode via the orifice array.

7. The method of claim 1, comprising performing e) subsequent to a)-d).

8. The method of claim 1, comprising performing e) simultaneously with a)-d).

9. The method of claim 1, comprising, for a), b) c) and h), automatically determining with a control section of the gas supply system, the orifice of the orifice array to which the gas is flowed from the first flow controller or the second flow controller, the gas being flowed through the orifice at a viscous sonic flow rate for each of the first, second and third set flow rates.

10. The method of claim 1, wherein the first and second flow controllers are mass flow controllers.

11. The method of claim 1, wherein the gas is a tuning gas.

12. The method of claim 1, comprising replacing the first flow controller and/or the second flow controller with a respective replacement flow controller, and repeating h).

13. The method of claim 1, comprising repeating a)-f) using a different gas.

14. A method for verifying process gas flow rates from a gas supply system to a plasma processing chamber, the method comprising:
a) setting a first flow controller to a first set point and flowing a first gas at a first flow rate from the first flow controller, the first gas flowing at a viscous sonic flow rate through a first orifice of an orifice array into a plasma processing chamber;
b) measuring a pressure (P1) and temperature (T1) of the first gas upstream of the first orifice at the first flow rate;
c) measuring a cross-sectional flow area (A) of the first orifice;
d) determining for the first gas, the specific heat at constant volume (Cv), the specific heat at constant pressure (Cp), the molecular weight (M) and the absolute flow empirical factor (Ka); and
e) calculating the flow rate Q of the first gas through the first orifice using the following equations (i)-(iii):
(i) •Ka
where R0 is the universal gas constant:
(ii) $\ddot{\gamma}$=Cp/Cv, and
(iii) P2/P1=[2/($\ddot{\gamma}$+1)]$\ddot{\gamma}$/($\ddot{\gamma}$−1)=rc.

15. The method of claim 14, wherein the plasma processing chamber comprises inner and outer zones through process gas is supplied by a showerhead electrode via the orifice array.

16. The method of claim 14, wherein the first flow controller is a mass flow controller.

17. The method of claim 14, comprising:
setting the first flow controller to a second set point and flowing the first gas at a second flow rate from the first flow controller, the first gas flowing at a viscous sonic flow rate through the first orifice or a second orifice of the orifice array into the plasma processing chamber;
repeating b)-e) for the second set point of the first flow controller.

18. The method of claim 14, repeating a)-e) for at least a second flow controller.

19. A computer readable medium having a computer readable program code stored thereon, the computer readable medium implementing the method of claim 14.

20. A method for verifying process gas flow rates from a gas supply system to a plasma processing chamber, the method comprising:
a) setting a first flow controller to a first set point and flowing a carrier gas at a first flow rate from the first flow controller, the carrier gas flowing at a viscous sonic flow rate through a first orifice of an orifice array into a plasma processing chamber;
b) measuring a pressure (P1) and temperature (T1) of the carrier gas upstream of the first orifice at the first flow rate;
c) measuring a cross-sectional flow area (A) of the orifice;
d) determining for the carrier gas, the specific heat at constant volume (Cv), the specific heat at constant pressure (Cp), the molecular weight (M) and the absolute flow empirical factor (Ka);
e) calculating the flow rate Q of the carrier gas through the orifice using the following equations (i)-(iii):
(i) •Ka
where R0 is the universal gas constant:
(ii) $\ddot{\gamma}$=Cp/Cv, and
(iii) P2/P1=[2/($\ddot{\gamma}$+1)]$\ddot{\gamma}$/($\ddot{\gamma}$−1)=rc.
e) then setting a second flow controller to a second set point and flowing a seed gas at a second flow rate from the second flow controller, the seed gas being mixed with the carrier gas to form a gas mixture which is flowed through the first orifice and into the plasma processing chamber, the second flow rate being subsonic and/or non-viscous when the seed gas alone is flowed through the first orifice;
f) measuring the pressure (P1) and temperature (T1) of the gas mixture upstream of the first orifice;
g) calculating the flow rate Q of the gas mixture through the first orifice using equation (i) and Cv, Cp, M and Ka for the carrier gas; and
h) comparing the value of Q of the carrier gas to the value of Q of the gas mixture to determine the flow rate of the seed gas through the first orifice.

21. The method of claim 20, wherein the plasma processing chamber comprises inner and outer zones through which process gas is supplied by a showerhead electrode.

22. The method of claim 20, wherein the first flow controller is a mass flow controller.

23. The method of claim 1, wherein the first orifice of the orifice array defines a first cross-sectional area and the second orifice of the orifice array defines a second cross-sectional area, the first cross-sectional area being different from the second cross-sectional area.

24. The method of claim 1, wherein the orifice array includes orifices having diameters of 0.007 inch, 0.010 inch, 0.015 inch, 0.20 inch and 0.30 inch.

25. The method of claim 1 wherein the flow verification provides accuracy values of $\leq \pm 6\%$ at >5 sccm, $\leq \pm 10\%$ at 1-5 sccm and precision values of $\leq \pm 1\%$ at >5 sccm, $\leq \pm 4\%$ at 1-5 sccm.

\* \* \* \* \*